(No Model.)
W. FOWLER.
ODOR ARRESTING LID FOR VESSELS.
No. 511,692. Patented Dec. 26, 1893.
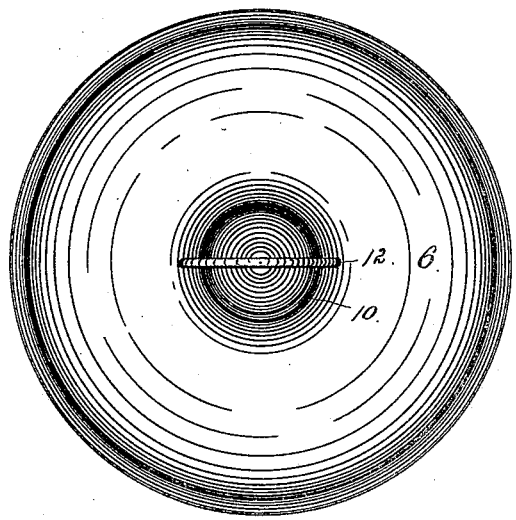
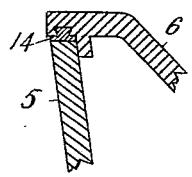
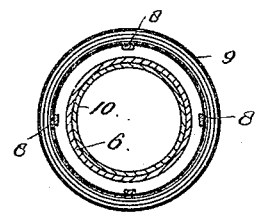
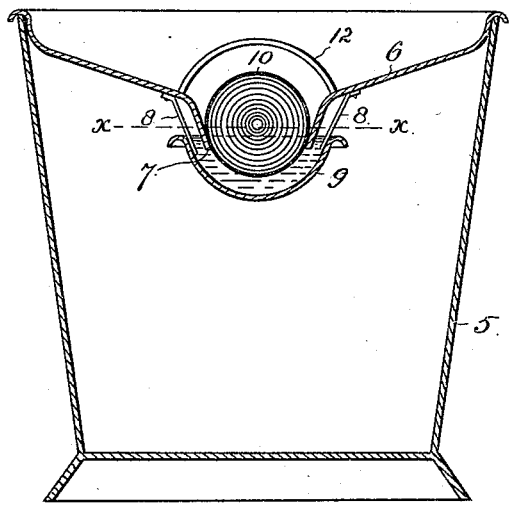
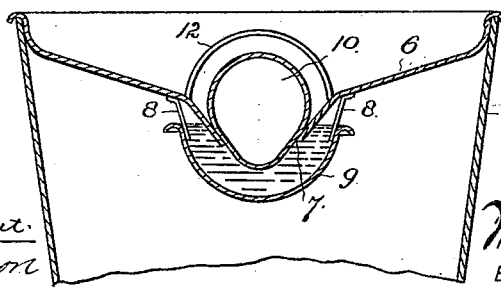
WITNESSES:
INVENTOR
William Fowler
BY
ATTORNEY.

UNITED STATES PATENT OFFICE.

WILLIAM FOWLER, OF COLORADO SPRINGS, COLORADO.

ODOR-ARRESTING LID FOR VESSELS.

SPECIFICATION forming part of Letters Patent No. 511,692, dated December 26, 1893.

Application filed May 1, 1893. Serial No. 472,561. (No model.)

*To all whom it may concern:*

Be it known that I, WILLIAM FOWLER, a citizen of the United States of America, residing at Colorado Springs, in the county of El Paso and State of Colorado, have invented certain new and useful Improvements in Odor-Arresting Lids for Vessels; and I do declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in covers for slop buckets and similar vessels, and the object of the improvement is to provide a cover which shall render these receptacles odorless and at the same time allow the free entrance of liquids from the outside.

To this end my improved vessel cover or lid consists of the features hereinafter described and claimed, all of which will be fully understood by reference to the accompanying drawings in which is illustrated an embodiment thereof.

In the drawings, Figure 1 is a top view of the device. Fig. 2 is a longitudinal section taken through the bucket with the lid in place. Fig. 3 is a similar view showing another form of valve for the lid. Fig. 4 is a transverse section taken on the line $x-x$, Fig. 2, the cup-shaped part being shown in plan view. Fig. 5 is a fragmentary section showing a modified form of construction.

Similar reference characters indicating corresponding parts or elements in these views, let the numeral 5 designate the body of the vessel, and 6 the lid which is concave exteriorly or depressed below the plane of the vessel's top a sufficient distance to serve the convenience of those pouring liquids thereinto. It will be observed the exact shape of this cover is not material so long as the liquids discharged thereon are carried downward toward the center which is provided with an opening 7. Below this opening is supended by means of hangers 8 attached to the under surface of the lid, a cup-shaped device 9 formed preferably with rounded edges over which the liquids pass which enter the aperture 7. The center of the lid projects below the rounded edge of the cup-shaped device, whereby the passage way from the lid to the interior of the vessel is always sealed with liquid. In addition to this liquid seal, this passage way is closed by a loose valve 10 which may be spherical, oval, conical or any other desired shape. It is preferably hollow and formed of rubber, but it may be of any other construction and formed of any other material, provided that the valve is of such specific gravity that it will readily float in water, whereby it will be raised by the liquid poured upon the cover, and allow the same to pass freely to the vessel below.

Attached to the exterior surface of the cover, is a guard 12 which curves upwardly over the valve. This guard is of such construction that while it allows the valve to rise sufficiently to permit the free entrance of the liquids to the vessel, it, at the same time, prevents the valve from leaving the cover. This valve being preferably a hollow elastic body, may be easily removed from its seat and as readily replaced beneath the guard.

The lid should be of such construction that it fits nicely within the top of the vessel thus preventing the escape of any odor between the top of the vessel and the edge of the lid. This attachment is preferably made by frictional contact, the lid being pressed tightly into the top of the vessel.

In case the vessel is formed of porcelain, glass or some similar brittle material, a rubber gasket 14 should be attached to the lid, which is preferably provided with a dovetailed groove into which the gasket is pressed and whereby it will be retained in place. This construction is shown in Fig. 5.

The float valve 10 may be formed of carbolized rubber or it may be saturated with any suitable deodorizing material.

Having thus described my invention, what I claim is—

1. As an improved article of manufacture, a vessel lid centrally depressed and apertured, and provided with a cup-shaped trap supported by legs attached to the under surface of the lid and to the inner surface of the trap whose edge is rounded and turned downward to facilitate the escape of substances having a tendency to catch upon the edge of the trap, the central portion of the lid projecting into the trap sufficiently to seal the orifice when the trap is filled with liquid, substantially as described.

2. As an improved article of manufacture, a vessel lid centrally depressed and apertured, and provided with a loose float valve adapted to close the aperture in the lid normally, a metal strap having its extremities attached to the upper surface of the lid and projecting above the valve forming a guard to maintain the valve in suitable operative relation with the lid, and a cup-shaped trap into which the center of the lid dips, said trap being supported by hangers attached to the lid, substantially as described.

3. As an improved article of manufacture, a vessel lid abruptly depressed near its outer edge to fit tightly within the sides of the vessel, and centrally depressed and apertured, forming an escape orifice for the liquid discharged upon the lid, a hollow, oval or egg-shaped float valve adapted to seat itself in the central orifice and normally close the same, the lid being provided with a metal strap projecting above the valve and forming a guard, and a cup-shaped-trap supported beneath the orifice and into which the center of the lid dips, said trap having rounded edges to facilitate the escape of substances having a tendency to catch upon the parts, substantially as described.

In testimony whereof I affix my signature in the presence of two witnesses.

WILLIAM FOWLER.

Witnesses:
   CHAS. E. DAWSON,
   ALFRED J. O'BRIEN.